(12) United States Patent
Knapp et al.

(10) Patent No.: US 6,795,632 B1
(45) Date of Patent: Sep. 21, 2004

(54) SYSTEM FOR MANAGING SLACK IN FIBER OPTIC CABLES CONNECTED TO A CIRCUIT BOARD

(75) Inventors: Daniel Knapp, San Jose, CA (US); James Casciani, Cupertino, CA (US)

(73) Assignee: Ciena Corporation, Linthicum, MD (US)

( * ) Notice: Subject to any disclaimer, the term of this patent is extended or adjusted under 35 U.S.C. 154(b) by 55 days.

(21) Appl. No.: 10/002,472

(22) Filed: Nov. 2, 2001

(51) Int. Cl.[7] ................................................ G02B 6/00
(52) U.S. Cl. ..................... 385/135; 385/136; 385/137
(58) Field of Search ................................ 385/135, 136, 385/137

(56) References Cited

U.S. PATENT DOCUMENTS

| | | | | |
|---|---|---|---|---|
| 5,127,082 A | * | 6/1992 | Below et al. ............... | 385/135 |
| 5,469,526 A | * | 11/1995 | Rawlings .................... | 385/135 |
| 5,659,641 A | * | 8/1997 | DeMeritt et al. ............. | 385/14 |
| 5,987,207 A | * | 11/1999 | Hoke .......................... | 385/135 |
| 6,434,314 B1 | * | 8/2002 | Gatica et al. ................ | 385/136 |
| 6,457,874 B1 | * | 10/2002 | Clapp et al. .................. | 385/75 |
| 6,567,602 B2 | * | 5/2003 | Cole et al. ................... | 385/136 |

* cited by examiner

*Primary Examiner*—Chandrika Prasad

(57) ABSTRACT

A method and system of managing slack in fiber optic cables connected to a circuit board is provided. A fiber optic cable is supported at a point between and not colinear with the two points to which it is attached to the circuit board. The fiber optic cables are preferably supported a vertical distance above the circuit board each with a plurality of points of support on a radius guide, preferably two radius guides. The radius guides each have a leading edge and a trailing edge for supporting the cable and a curved central portion therebetween around which the cable is bent. The cables are preferably tensioned between at least two of the points of support so that cables of differing lengths are taut to prevent movement during shipping or to prevent vibration that would otherwise be caused by air flow over the circuit board.

13 Claims, 15 Drawing Sheets

SYSTEM FOR MANAGING SLACK IN FIBER OPTIC CABLES CONNECTED TO A CIRCUIT BOARD

BACKGROUND OF THE INVENTION

1. Field of the Invention

The invention relates to devices which utilize fiber optic cables. More specifically, the invention relates to methods and apparatuses which manage or organize the fiber optic cables in use in such devices.

2. Description of the Related Art

Modern computer and telecommunications networks are constantly growing more complex and have an ever-expanding need for bandwidth (the ability to accept, process, and/or transmit information). Many of the components used in such networks utilize optical transceivers and optical fibers as the means of communicating among and within the various components.

One of the ways that optical network components have become more complex over the years is through an increased density of optical transceivers and fibers. Typically, the optical fibers employed in a telecommunications device are mounted at one end on a circuit board or line module of some sort; the other end of the fiber exits the device to be connected to other devices or otherwise hook into a network. As fiber optic cables enter a circuit board through the front of the faceplate, another cable may attach to the rear of the faceplate at a bulkhead connector.

In many applications, a multi-fiber ribbon is employed instead of single incoming fibers. The incoming fiber ribbon can consist of up to 24 individual optical fibers. On the rear side of the faceplate of the line module, a Y-cable is typically used to connect the circuit board to the backplane of a telecommunications routing device. The Y-cable will branch off into two smaller ribbons; in the case of a 24-fiber ribbon, it will branch off into two 12-fiber branches, each branch terminating in a connector head.

If the end of one of the branches of the Y-cable is damaged, or even if only one of the 12 fibers in the connector head is damaged, the whole connector head must be severed, and that branch must be re-terminated. Typically, one must cut approximately ¾ of an inch of cable off to effect a re-termination repair. It is not cost effective to throw out an entire Y-cable if only one branch sustains minimal, repairable damage. As a result, some cables are a little shorter than others, and in some Y-cables of this type, one branch may be shorter than the other branch.

Most modules or circuit boards have multiple inputs for fiber ribbons on the faceplate and thus must accommodate multiple fiber ribbons internally as well. For example, the SMX module sold by Ciena Corporation (the assignee of the instant invention) requires up to six 24-fiber ribbons. If Y-cables are employed internal to the faceplate, up to twelve smaller ribbons will be passing directly over the circuit board.

Having numerous cables passing over a circuit board can have deleterious effects on the performance of the system. First, the devices in which these circuit boards are employed are typically air cooled with the air flowing across the circuit board. If multiple fiber ribbons are haphazardly coiled on the circuit board, they will block or deflect the cooling air, and the components will not be cooled effectively. Also, if the fiber ribbons are not taut, the air flow may cause the slack fibers to vibrate. Vibration of the optical fibers against the circuit board can damage the circuit board, damage the fibers, and/or disrupt the flow of data through the fibers.

The conventional way to manage slack in multiple cable situations, such as in splice trays, patch panels, or wall mount enclosures, is by wrapping the cables around a spool or a ring. An example of this configuration is a product sold by AMP as part number 492440-1. In this product, 12 incoming fibers are wrapped around a central spool on the circuit board.

Such a configuration is not practical for fiber ribbon applications or many other applications. First, the fiber ribbon has a minimum bend radius which might be compromised were the ribbon to be wrapped around a spool, especially since each individual fiber would be bent at a slightly different radius, and even the same fiber would be bent differently as it wrapped around itself. There is also a great danger of twisting the ribbon as it is wound around the spool. Multi-fiber ribbon, for example, has a maximum twist specification of ten 180° twists per yard or so of ribbon, or approximately 90° in a minimum of about 2 inches of ribbon. Uncontrolled or excessive twisting of a ribbon could easily harm the optical fiber components therein, especially since they will also be bent. Further, it would be difficult to accommodate the possible variations in length of the branches of the fiber ribbons. Regardless of what type of fiber or fiber ribbon is employed, the spool would also interfere with the air cooling of the circuit board, board mounted components, and the overall device. Finally, it is much more difficult to service and/or replace a specific cable when several are wrapped around a single spool. In the case of the Ciena SMX module, 12 fiber ribbons would be wrapped around a spool, a configuration which would prove inconvenient to service.

SUMMARY OF THE INVENTION

The invention is a method and system of managing slack in fiber optic cables connected to a circuit board. The fiber optic cables are supported a vertical distance away from the circuit board each with at least one point of contact away from the circuit board. The point of support away from the circuit board is not colinear with the two points at which the cable is attached to the circuit board. Support is preferably provided in a plurality of points of support on a radius guide, preferably two radius guides. The radius guides each have a leading edge and a trailing edge for supporting the cable and a curved central portion therebetween around which the cable is bent. The cables are preferably tensioned between at least two of the points of support so that cables of differing lengths are all relatively taut over at least a portion of the lengths of the cables to prevent movement during shipping or to prevent vibration that would otherwise be caused by air flow over the circuit board.

Preferably, a tensioning assembly is provided contacting the cable at a point between the first and second radius guides providing tension to the cable. The tensioning assembly may include a leaf spring which is biasable against the cable and may be attachable to one of the radius guides. In the alternative, the tensioning assembly may be attachable to the circuit board above one of the radius guides. As another alternative, a single, larger radius guide could be employed, and the tension could be applied between the leading and trailing edges of that larger radius guide.

By moving the fiber optic ribbons (or cables) off of the circuit board of a module, air flow across the board remains unimpeded, and the components thereon can be cooled properly. Also, by keeping the ribbons in relatively straight lines instead of wrapping them around a common spool, the cables are more easily serviced. In addition, since the invention preferably keeps the ribbons taut, the ribbons will not vibrate or move around when air is blown over the circuit board or when the module is shipped, thereby helping to safeguard the integrity of the optical fibers in the ribbons.

In another aspect of the invention, the cable or ribbon is twisted only at a predetermined portion of the ribbon and only a predetermined angle, and the ribbon is prevented from being twisted anywhere else along its length. The inventive method and system prevent uncontrolled twisting of the fiber optic ribbons since they are preferably intentionally twisted only 90°, and that twist occurs wholly apart from where the ribbons are bent.

DETAILED DESCRIPTION OF THE EMBODIMENTS

Figure 1A:
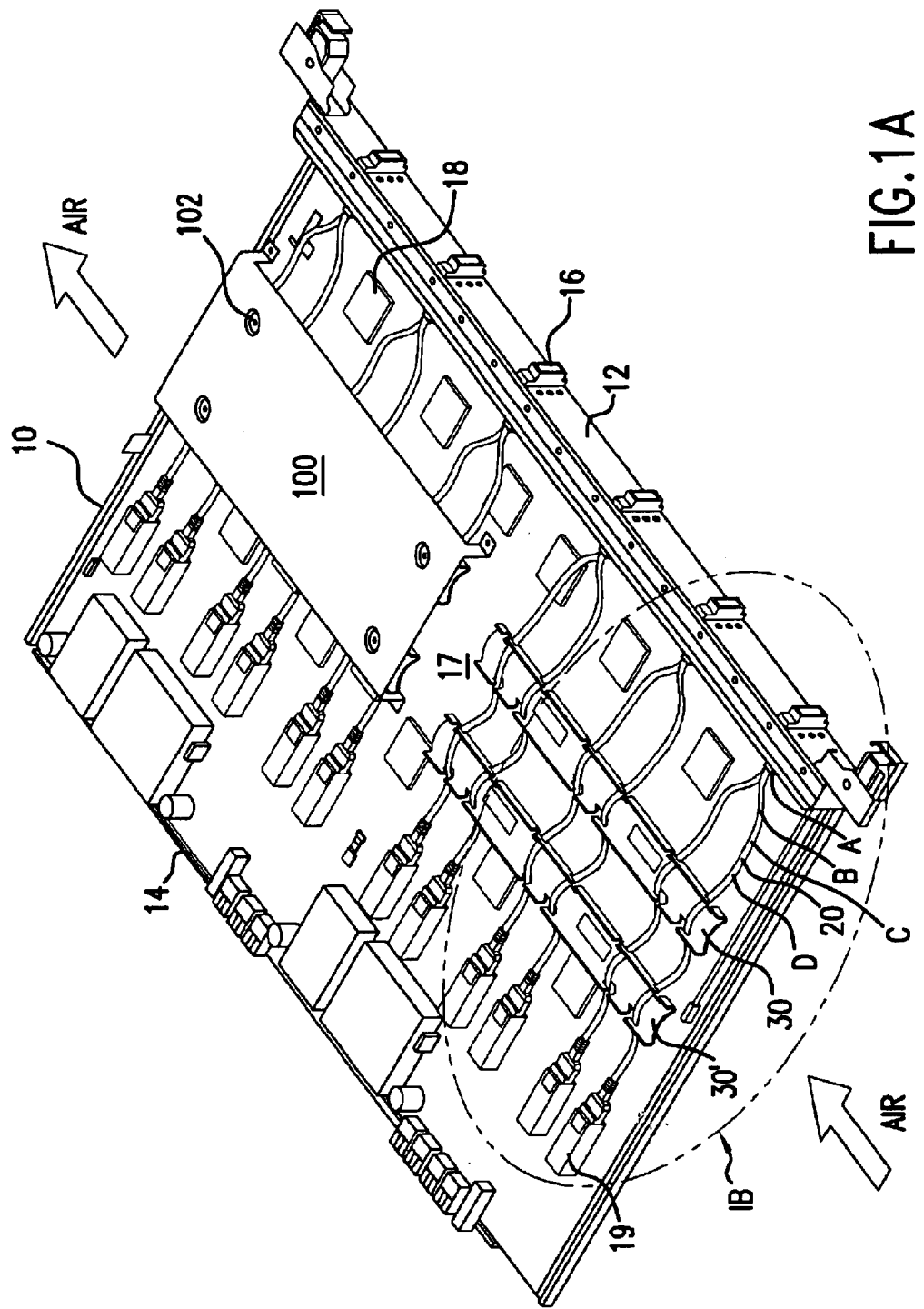
FIG. 1A is an isometric view of an embodiment of the invention being used on an SMX module.

Description of the invention will now be given of the invention with reference to FIGS. 1–11. It should be noted that the figures are exemplary in nature and are meant in no way to limit the scope of the invention.

FIG. 1 depicts an overview of an SMX module 10 employing an embodiment of the inventive slack management system. SMX module 10 includes a faceplate 12 on its front side and a rear side 14 attachable to the backplane of a larger telecommunications device, such as, for example, the Ciena Core Director (not shown). Disposed on faceplate 12 are connector adaptors 16. Optical fiber ribbons (not shown) are connectable to the front side of adaptors 16 (the jackets shown are MTP connector adaptors). Typically, in this specific module, 24-fiber ribbons are connected to adaptors 16. On the rear side of adaptors 16 at point A are connected Y-cables 20 which split off into two branches each having 12 fibers. Y-cables 20 are connected to circuit board 17 via board connectors 19 so as to act as conduits for data from incoming optical fibers through adaptors 16. Heat sinks 18 are disposed in various locations around circuit board 17.

In the example of FIG. 1, there are 12 branches to the six Y-cables 20. Under a conventional slack management scheme, these twelve branches would be wound around a spool on the circuit board itself. As explained above, this configuration would be undesirable. Instead, the inventive method raises Y-cables 20 off of circuit board 17 and allows for the cables to be maintained in a relatively straight line, under tension, without bending them in an uncontrolled fashion. The Y-cables 20 are preferably elevated off of board 17 and supported at points B and D by clips 50 (see FIGS. 9 and 10) which will be described below. By raising the cables off of the circuit board, air flow (as depicted by the AIR arrows in FIG. 1A, for example) can travel relatively unimpeded across module 10.

From the initial positions just described, Y-cables 20 are snaked over and through radius guides 30 and 30'. The embodiment shown depicts the use of two radius guides, however any convenient number may be used (even one, depending on the geometry). The radius guides are best shown in most detail in FIGS. 6 and 7. In this exemplary embodiment, radius guide 30 (the same description is equally applicable for radius guide 30') has raised walls 32 and 34 which form leading and trailing edges, respectively. Formed in both raised walls 32 and 34 are retaining notches 36. Y-cables 20 are threaded through retaining notches 36 so that they do not migrate laterally during shipping, under air flow conditions, or otherwise during operation. Retaining arms 35 preferably extend across at least some or all of retaining notches 36. These help to keep Y-cables 20 from coming out of the tops of retaining notches 36. The central portion of radius guide 30 is a curved plane 38. Y-cables 20 rest at least partially across plane 38 as shown in FIGS. 1 and 2.

Figure 6A:
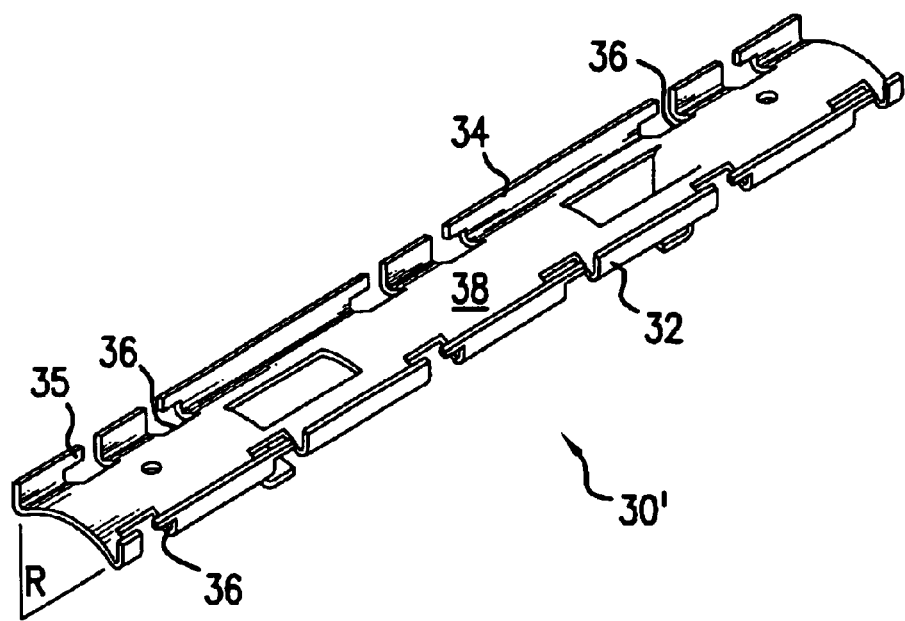
FIGS. 6A–E are a perspective view and multiple side views of a rear radius guide in accordance with one embodiment of the invention.
Figure 6B:
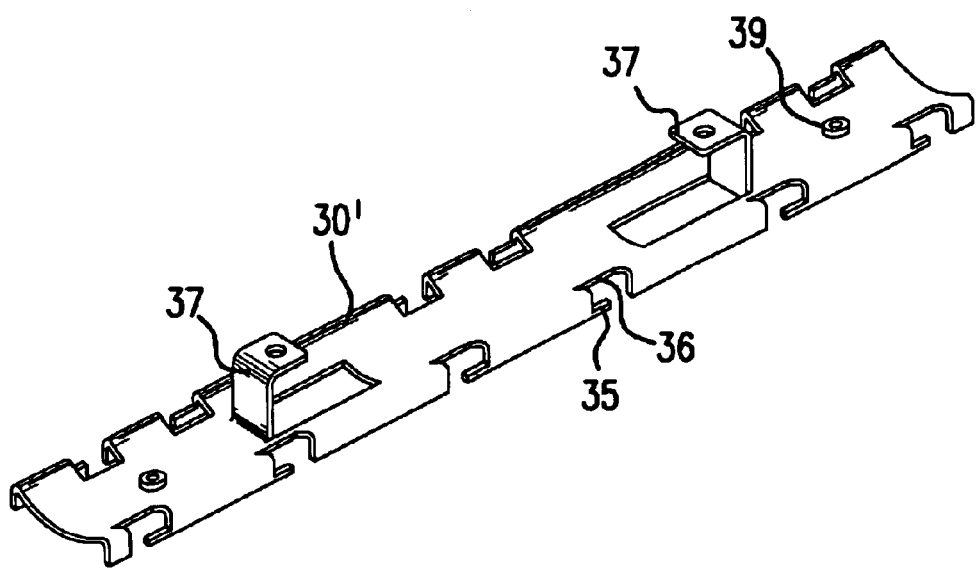
Figure 6C:
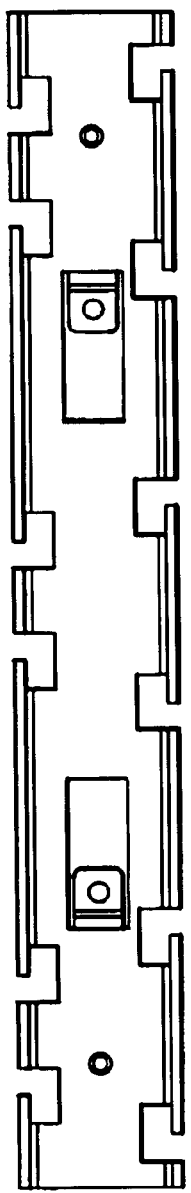
Figure 6E:
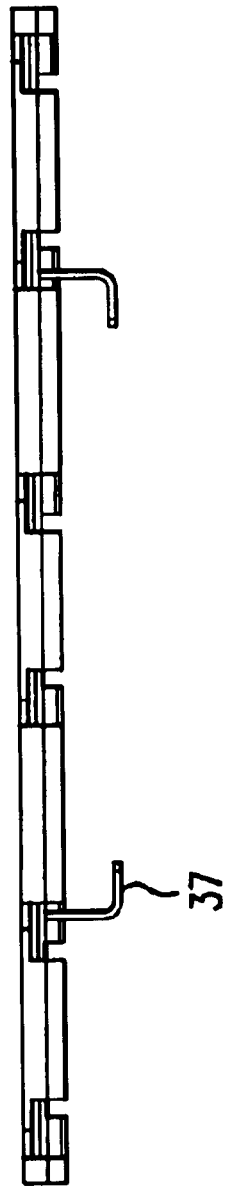
Figure 6D:
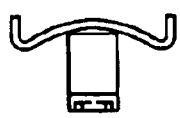
Figure 7A:
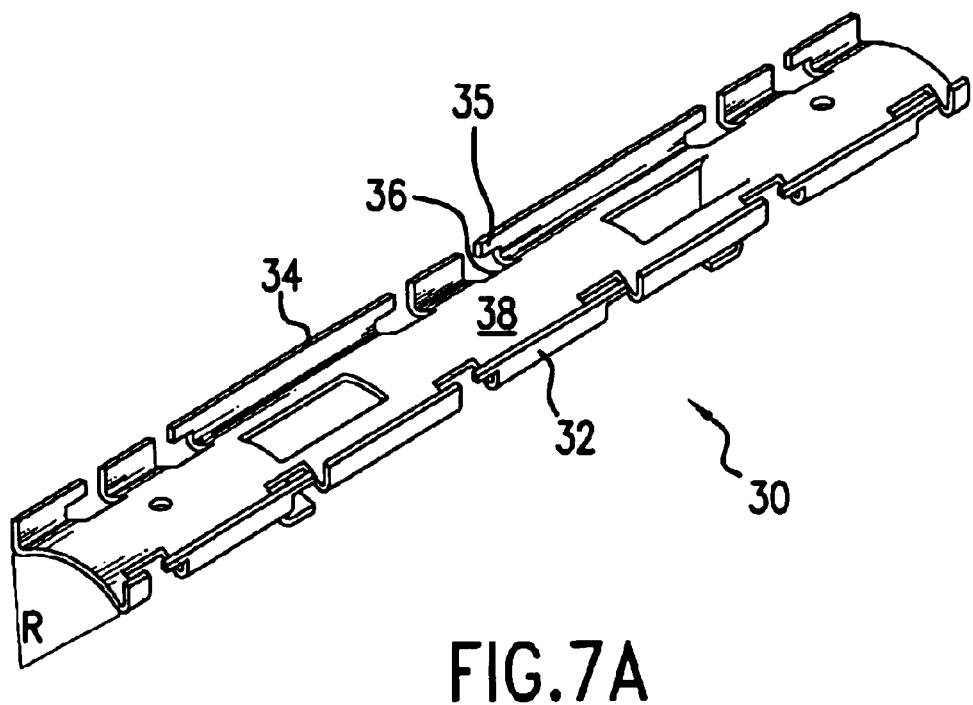
FIGS. 7A–E are a perspective view and multiple side views of a front radius guide in accordance with one embodiment of the invention.
Figure 7B:
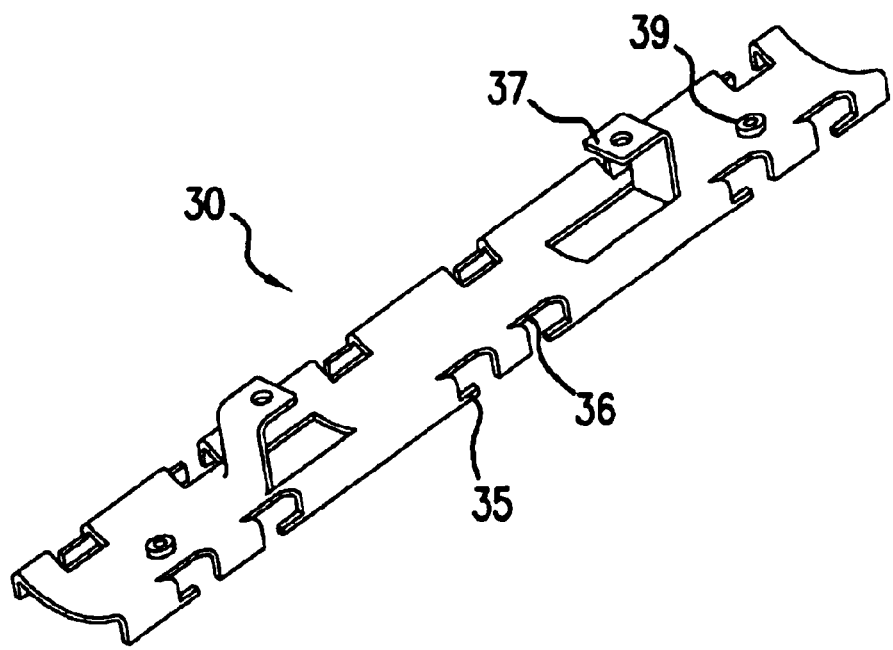
Figure 7C:
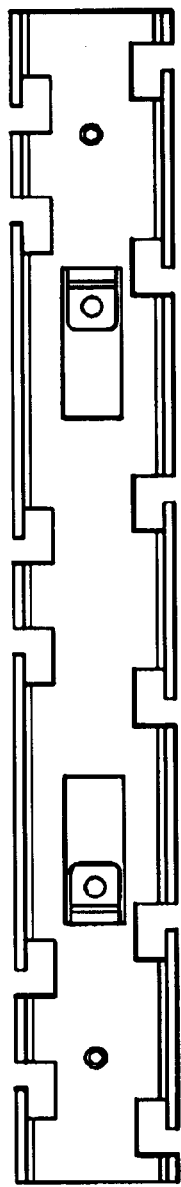
Figure 7D:
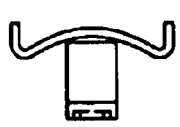
Figure 7E:
Figure 8:
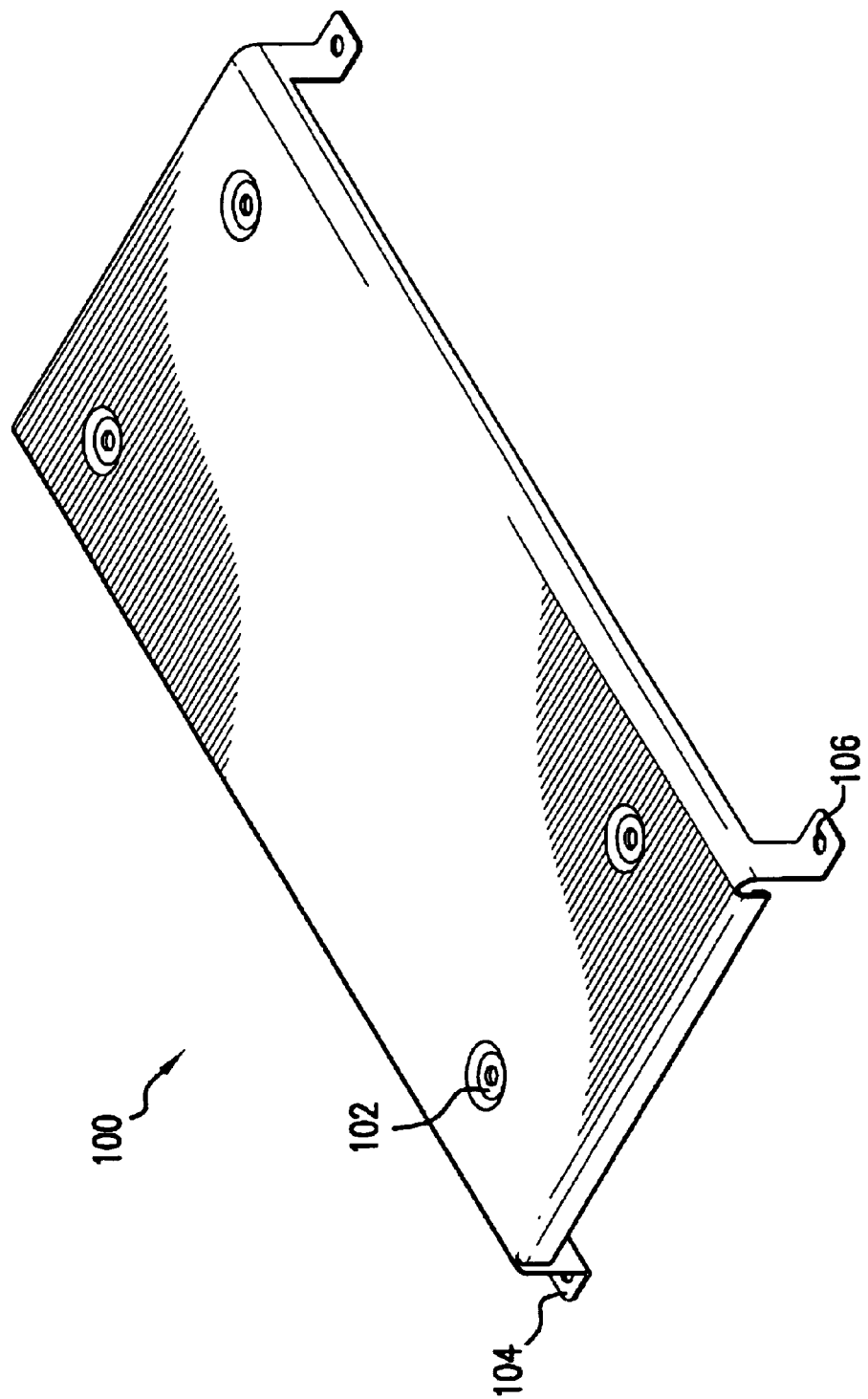
FIG. 8 is a perspective view of a cover in accordance with one embodiment of the invention.

The radius of curvature R of curved plane 38 (see FIGS. 6A and 7A, for example) is preferably dimensioned to be no less than the minimum bend radius of the fiber being supported. That way, there is little danger of the fiber being broken by overbending. The bottom of radius guide 30 is preferably provided with one or more feet 37 which are secured to board 17. As shown in FIG. 6D, for example, in this exemplary embodiment, the fiber cable is raised off of the board approximately ¾ of an inch. Nuts 39 are used to secure other structures to the radius guide 30, as will be explained below.

Figure 1B:
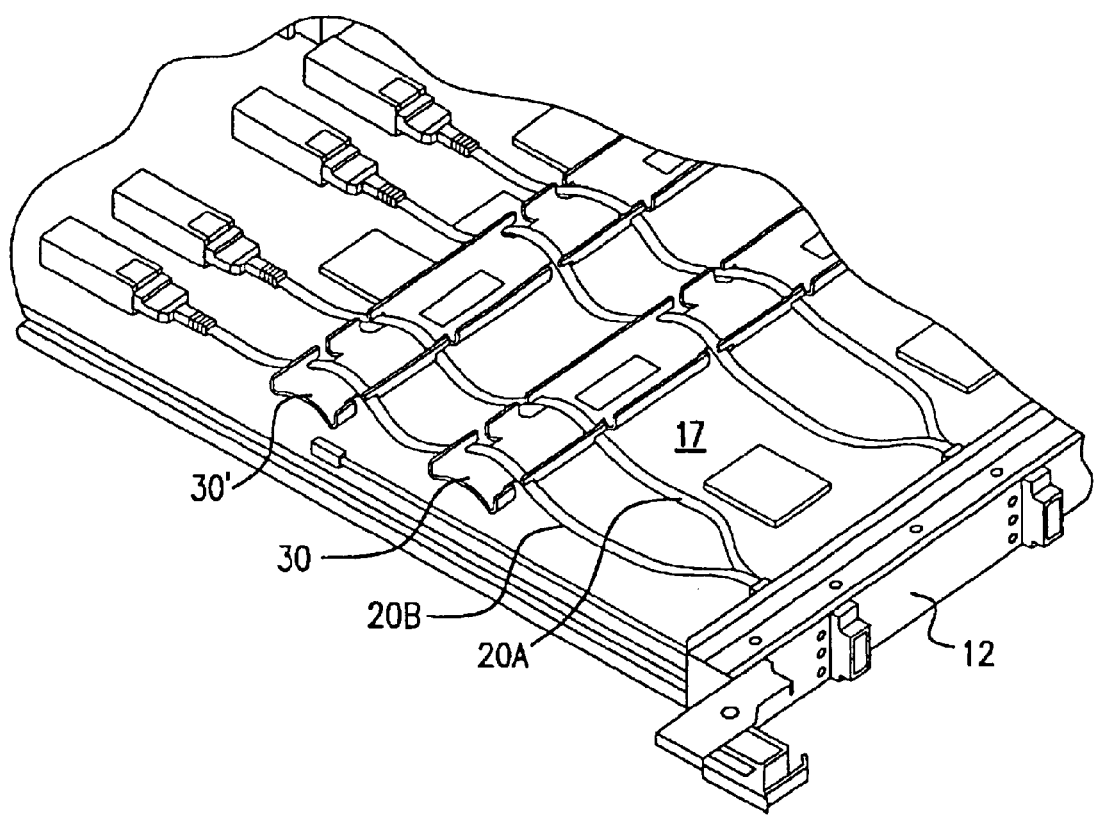
FIG. 1B is a detail view of the portion IB of the embodiment of FIG. 1A.
Figure 1C:
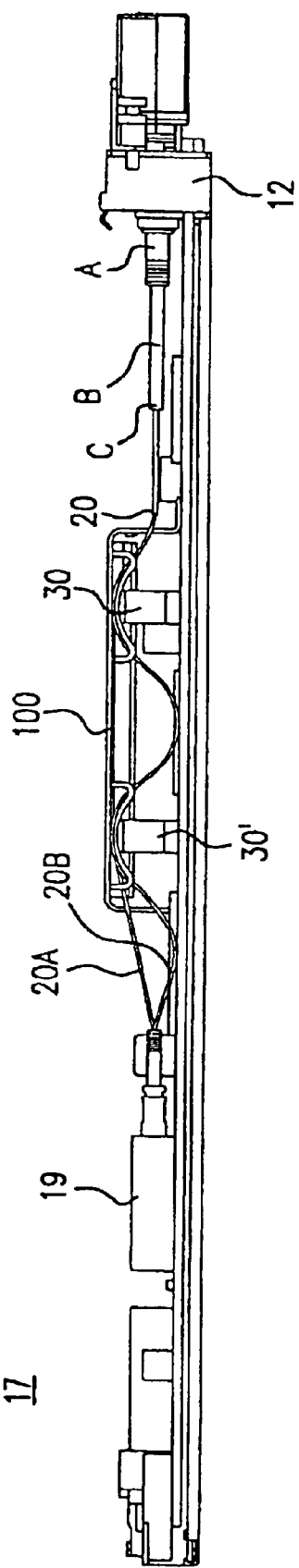
FIG. 1C is a side elevation view of the embodiment of FIG. 1A.
Figure 2:
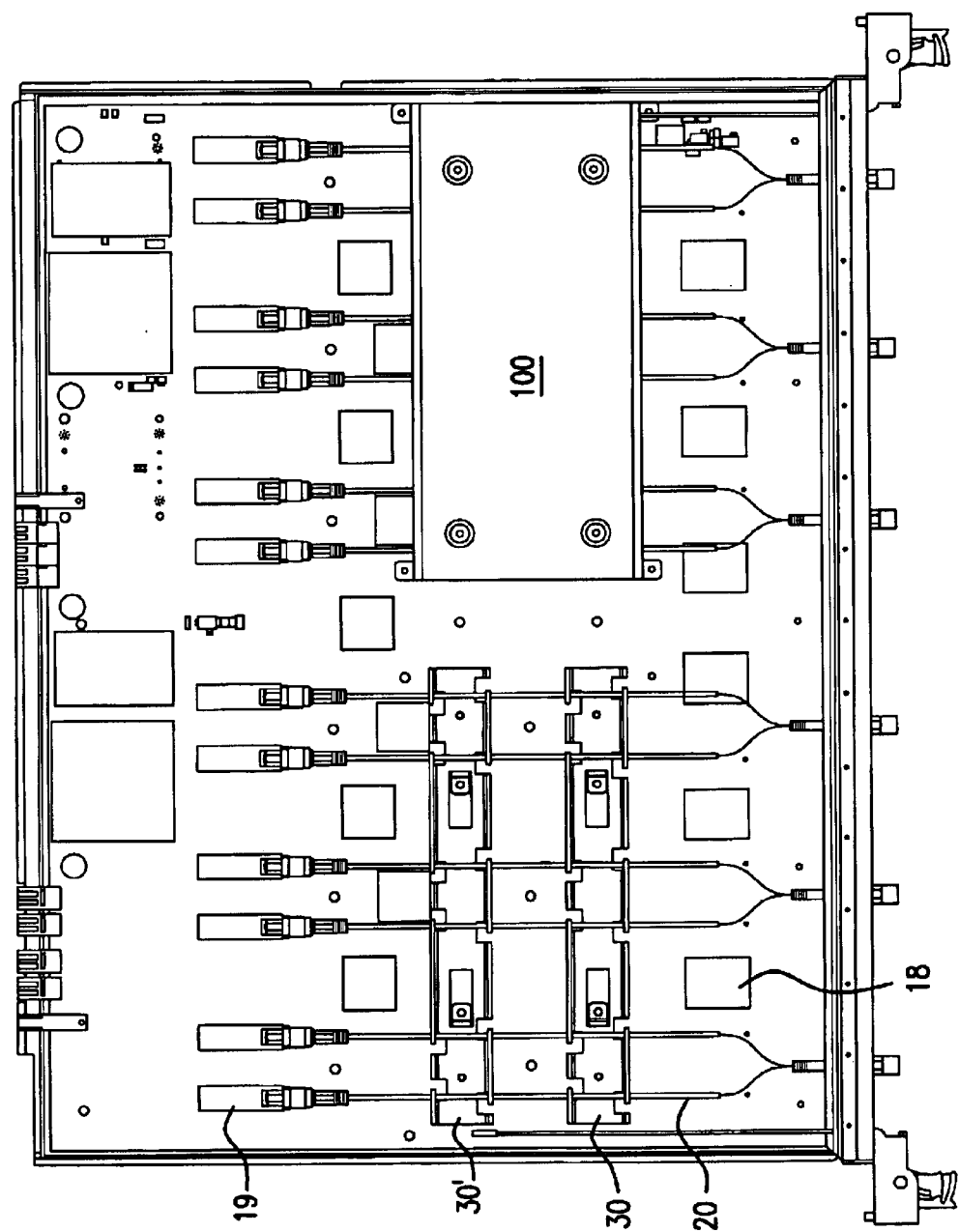
FIG. 2 is a top plan view of the embodiment of FIG. 1A.

As shown in FIGS. 1–2, this embodiment includes two radius guides 30 and 30'. Fiber passes from point A in a vertical orientation, is preferably supported above board 17 by a clip 50 at point B, and then is twisted 90° about its long axis to be relatively flat at point C. The now-flat fiber ribbon may be supported again at point D by another clip 50 and then passes through a retaining notch 36 in leading raised wall 32 of radius guide 30. The fiber ribbon is bent over curved plane 38 and then passes through another retaining notch 36 in trailing raised wall 34.

Depending on whether the cable is a shorter cable or a longer cable, it will sit differently across radius guide 30. If it is a shorter cable, such as cable 20A in FIG. 1B (e.g., it needed to be repaired and was shortened at some point), it will contact the underside of retaining arms 35 and pass more or less tangentially over curved plane 38. Shorter cable 20A will pass relatively straightly onto rear radius guide 30'. If the cable in question is a longer cable, such as cable 20B is FIG. 1B, it will rest on the upper surface of notch 36 itself and not necessarily make significant contact with retaining arm 35. Longer cable 20B will droop downwards between the trailing wall 34 of radius guide 30 and the leading wall 32 of radius guide 30', as shown in FIGS. 1B–C. Depending on their lengths, cables 20A and 20B may replicate the behavior they exhibit on radius guide 30' en route to board components 19.

Figure 4:
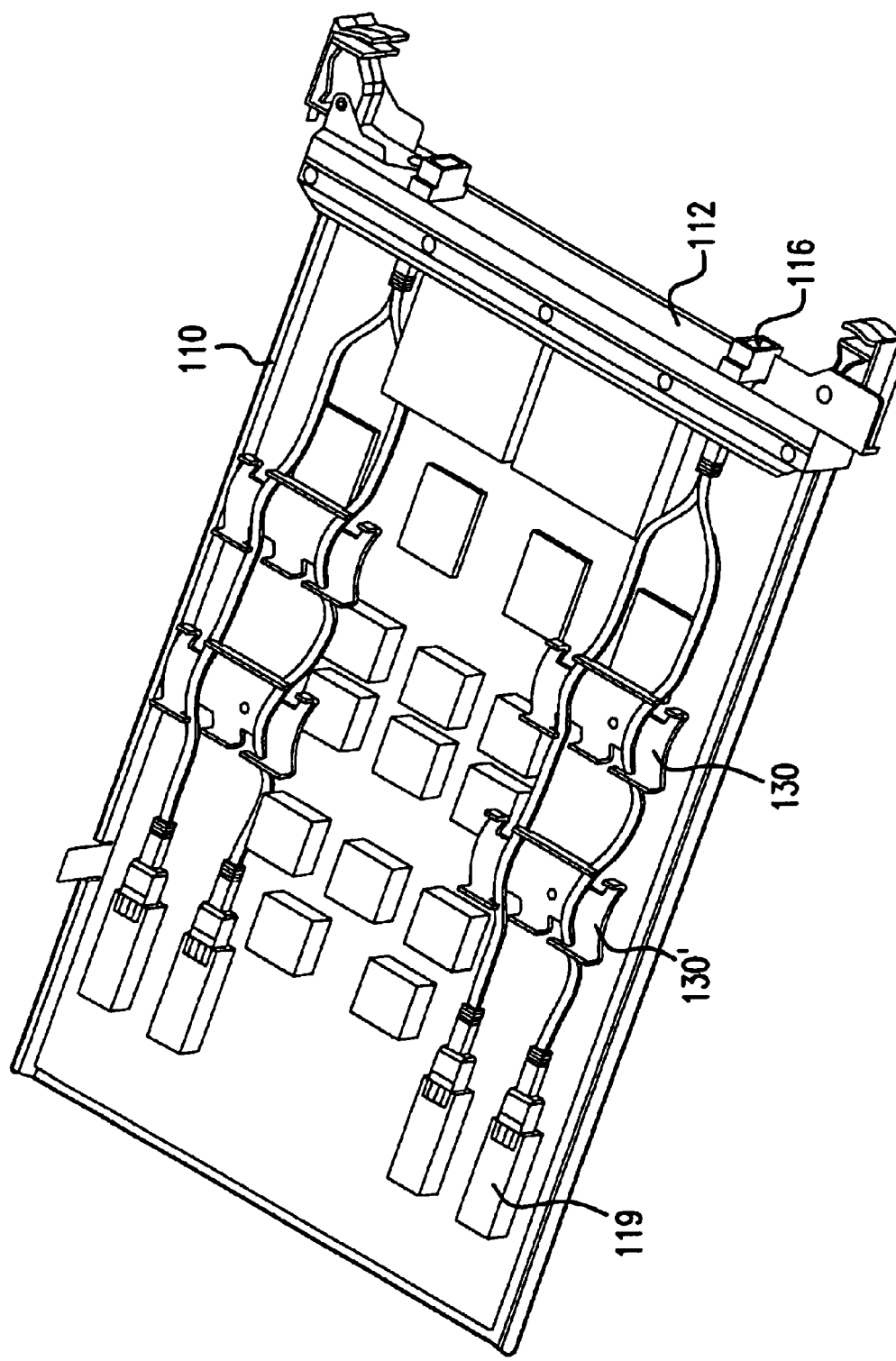
FIG. 4 is an isometric view of an embodiment of the invention being used on an ISM module.

FIG. 4 shows a similar embodiment to that described above in an ISM module application.

Figure 3:
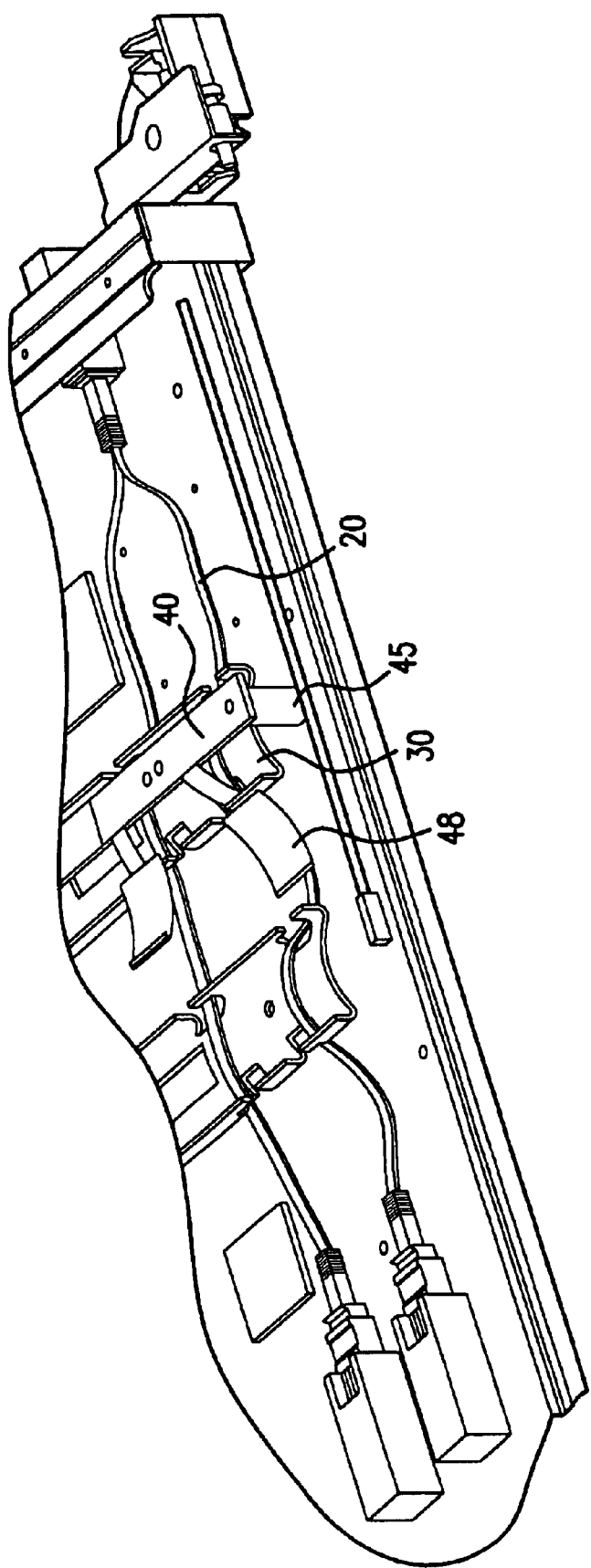
FIG. 3 is a partial isometric detail view of an additional embodiment of the invention as used on an SMX module.
Figure 5:
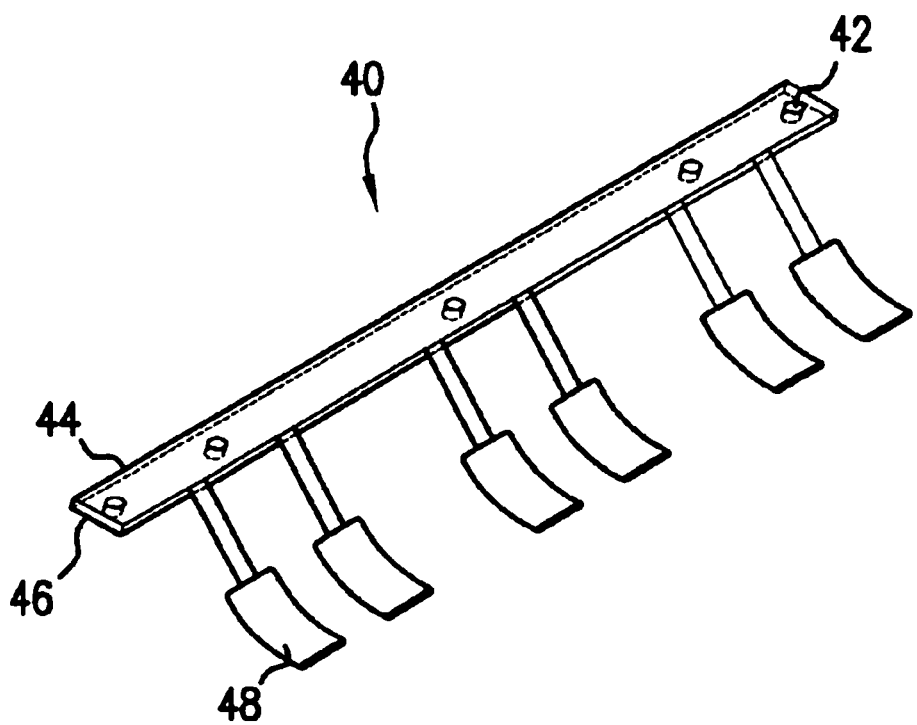
FIG. 5 is an isometric view of a fiber ribbon retainer spring assembly in accordance with one embodiment of the invention.

The above embodiment of the invention provides a satisfactory method and system of managing the slack of multiple fiber ribbons of varying lengths. However, the longer cables, such as cable 20B, may still be subject to motion and vibration during air flow and shipping. Thus, to insure that every cable is under some tension to reduce vibration, tensioning assembly 40 is added (see FIGS. 3 and 5) to press downward on the cables and place them in tension. As shown in FIG. 5, tensioning assembly 40 may include fasteners 42 for fastening the assembly 40 to the top of radius guide 30. Alternatively or in addition, as shown in FIG. 3, tensioning assembly 40 may be provided with feet 45 for securing the assembly directly to board 17.

Tension assembly 40 includes a tensioning spring 44 and a tension rail 46, both preferably made from a flexible material such as stainless steel. Leaf springs 48 cantilever out from tension rail 46. When applied over cables, such as the embodiment shown in partial view in FIG. 3 (i.e., above radius guide 30), leaf springs 48 push against cables 20A and 20B with a predetermined amount of spring force. This spring force is strong enough to add tension to slack cables, but not so strong that they bend already taut cables. That is, for shorter cable 20A, instead of deforming cable 20A, leaf spring 48 is effectively bent backward towards tension rail 46 as the tensioning assembly is pushed downward onto the cables.

Figure 9:
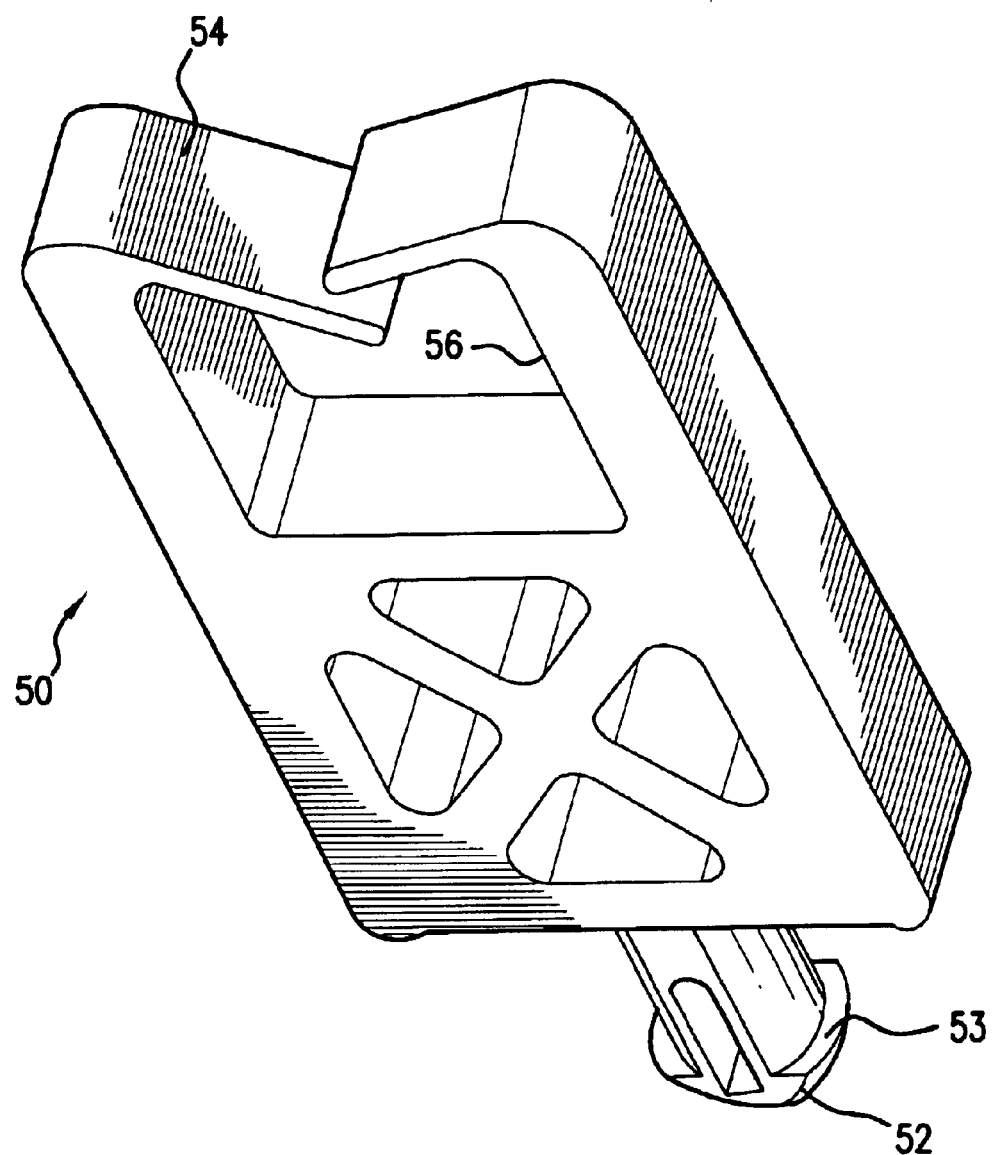
FIG. 9 is a perspective view of a fiber clip in accordance with one embodiment of the invention.
Figure 10:
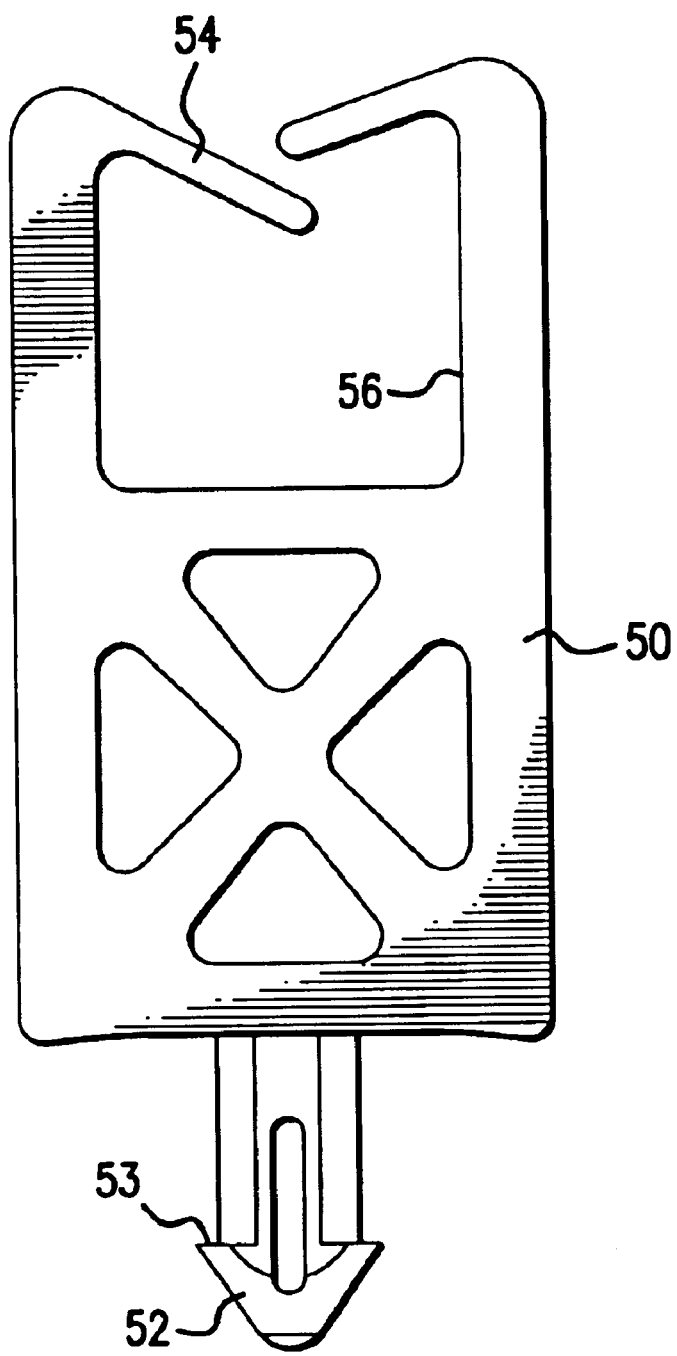
FIG. 10 is a side elevation view of the fiber clip of FIG. 9.

As mentioned above, the Y-cables 20 are preferably supported above the circuit board in front of the leading edge of radius guide 30. In FIG. 1A, the cables are supported at points B and D. One embodiment of structure that may accomplish this support is shown in FIGS. 9 and 10, i.e., clip 50. Clip 50 has a lower dart 52 which can be fastened to circuit board 17. Once clip 50 is pushed into a corresponding mounting hole (not shown) in the circuit board, clip 50 is secured onto board 17 by flange 53.

The top portion of clip 50 includes one or more resilient arms 54 above a retention space 56. As a fiber ribbon cable is being placed along the circuit board, it is pressed against resilient arm 54 and disposed in retention space 56. Resilient arm 54 flexes downward when cable 20 is pressed upon it, and arm 54 snaps back upwards when the cable is retained within space 56. Preferably, as shown in FIGS. 9 and 10, one arm 54 covers another arm 54 so that the accidental or unintentional removal of a fiber ribbon or other cable from space 56 is made extremely difficult and unlikely.

Space 56 is dimensioned to be able to receive a number of different widths of optical fiber cables. In the preferred embodiment, if 12-fiber Y-cables are used, it is preferred that the width of space 56 is not much greater than the width of the broad side of the cable. That way, the sides of retention space 56 can keep the cable fixed and not allow the cable to twist about its own longitudinal axis. That is, clips 50 would hold cable 20 not only in place above circuit board 17 but also in place angularly from a twist perspective. Since the cables typically arrive at the circuit board on their respective sides, i.e., narrow side down, it is preferred that the cable be twisted 90° so that the broad, flat side is facing down. That way, the cable may be bent and twisted more freely (bending and twisting the cable across the short side is not recommended). The 90° twist is shown in FIG. 1A as being made at point C between clip support points B and D. However, the twist need not occur at a single point, and it need not occur specifically between the two clips 50. It is preferred that the 90° twist occur somewhere in front of the leading edge of the front radius guide 30. More preferably, the 90° twist should occur somewhere between the first clip 50 and the leading edge of the first radius guide 30, two points which are preferably separated by approximately two inches. In this way, it is insured that the minimum twist specification is not violated.

The invention may also include a cover 100 to protect the fiber optics, the circuit board, and the rest of the slack management system. Cover 100 is shown in place in FIG. 1A and in perspective in FIG. 8. Cover 100 may be secured to the tops of radius guides 30, 30' via fastening holes 102. Fastening nuts 39 (see FIGS. 6B and 7B) are provided on the underside of radius guides 30 and 30' as one means of securing cover 100 to the radius guides. Cover 100 may also be provided with feet 104 having fastening holes 106 through which the cover may be bolted to circuit board 17.

The invention lends itself well to a simple manufacturing assembly procedure for all Y-cables regardless of whether they are closer to the long end or the short end of the length tolerance. The system assemblers clip long and short versions into the same clips on the circuit board and the same notches on the radius guides, and the twist and bend specifications for multi-fiber ribbons is met as assembled.

The invention is not limited to the description above. For example, the Y-cables have been described as having 24 fibers branching out into two bundles of 12 fibers each. However, the number of fibers per cable is irrelevant to the invention. Similarly, the number of branches into which the incoming ribbon subdivides is not limited to two. That is, a fiber ribbon could branch off into three or more sub-ribbons, or it need not branch off at all. Bare optical fibers of any type, size, or number can be accommodated by this invention.

Figure 11:
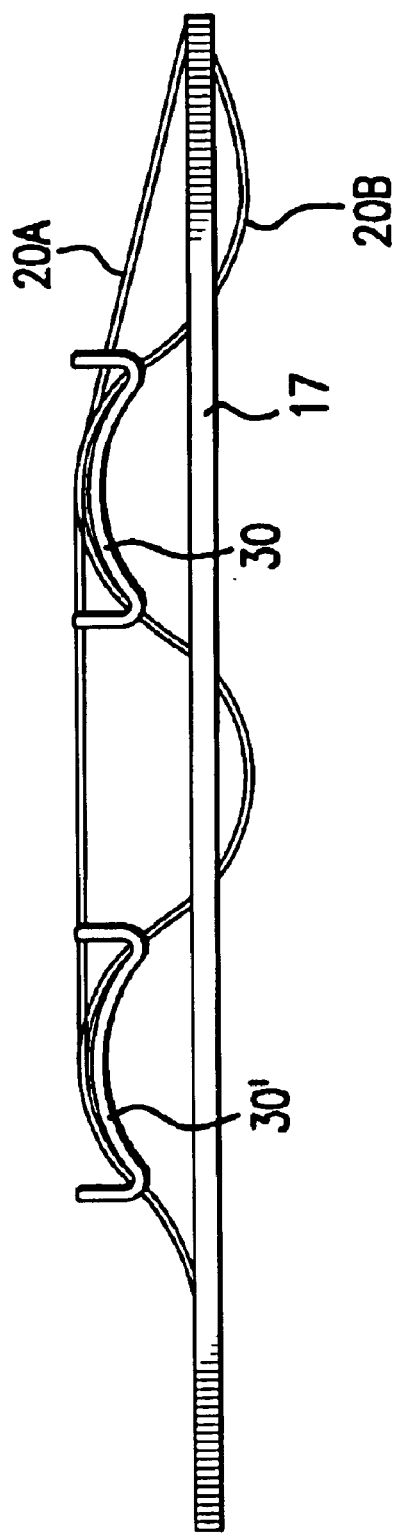
FIG. 11 is a side elevation view of another embodiment of the invention.

Further, the various fastening means employed to secure components to each other—for example, the cover to the radius guides or the radius guides to the circuit boards—is not limited to what is shown. The components may be fastened together by any number of different ways, including but not limited to adhesive, Velcro, rivets, screws, epoxy, solder, and any other fastening means known in the art Also, the invention is depicted as having two radius guides which are largely identical. However, more or fewer than two radius guides may be provided and need not be substantially similar. The support elements such as the radius guides and the clips need not be on the upper surface of the circuit board; the cable may be made to pass through holes in the circuit board and be supported under the circuit board as shown in FIG. 11, for example. In this sense, the displacing of the cable "above" the circuit board is in terms of absolute value of distance away from the circuit board. What is important is that the support point provided is not colinear with the two points at which the cable is connected to the circuit board.

Having described several embodiments of the invention, is to be understood that the description is not meant as a limitation excluding such further variations or modifications as may be apparent or may suggest themselves to those skilled in the art. It is intended that the present invention cover such variations and modifications as fall within the scope of the claims appearing hereinbelow.

What is claimed is:

1. A system of managing slack in fiber optic cables connected to a circuit board, comprising:

a first radius guide elevating a fiber optic cable received from one of a plurality of adaptors above a circuit board, said radius guide having a leading edge and a trailing edge which respectively provide two points of support for the fiber optic cable above the circuit board the leading edge and the trailing edge being arranged so that the fiber optic cable is positioned in substantially a linear direction from one of a plurality of adaptors to one of a plurality of connectors positioned on the circuit board, said first radius guide including a central curved portion between said leading edge and said trailing edge, wherein a fiber optic cable supported by said first radius guide is supported by said leading edge, is bent over said curved portion, and is supported by said trailing edge;

at least a first retaining notch formed on said leading edge and at least a second retaining notch formed on said trailing edge, said first and second retaining notches adapted to receive the fiber optic cable and provide said two points of support for the fiber optic cable;

a second radius guide similar to said first radius guide, spaced apart from said first radius guide; and a tensioning assembly contacting the fiber optic cable at a point between said first and second radius guides providing tension to the fiber optic cable, said tensioning assembly including a leaf spring which is biasable against the fiber optic cable.

2. A slack managing system according to claim 1, further comprising a retaining cross arm formed over at least one of said retaining notches, wherein when a fiber optic cable is a shorter fiber optic cable, the fiber optic cable contacts an underside of said retaining cross arm, and when a fiber optic cable is a longer fiber optic cable, the fiber optic cable contacts respective lower edges of said retaining notches.

3. A slack managing system according to claim 1, said tensioning assembly being attachable to one of said radius guides.

4. A slack managing system according to claim 1, wherein said first and second radius guides are disposed on the circuit board so that said leading edges are disposed closer to a front side of the circuit board and said trailing edges are disposed closer to the rear side of the circuit board.

5. A system of managing slack in fiber optic cables connected to a circuit board, comprising:

a first radius guide elevating a fiber optic cable received from one of a plurality of adaptors above a circuit board, said radius guide having a leading edge and a trailing edge which respectively provide two points of support for the fiber optic cable above the circuit board the leading edge and the trailing edge being arranged so that the fiber optic cable is positioned in substantially a linear direction from one of a plurality of adaptors to one of a plurality of connectors positioned on the circuit board, said first radius guide including a central curved portion between said leading edge and said trailing edge, wherein a fiber optic cable supported by said first radius guide is supported by said leading edge, is bent over said curved portion, and is supported by said trailing edge;

at least a first retaining notch formed on said leading edge and at least a second retaining notch formed on said trailing edge, said first and second retaining notches adapted to receive the fiber optic cable and provide said two points of support for the fiber optic cable;

a second radius guide similar to said first radius guide, spaced apart from said first radius guide said first and second radius guides each further including a plurality of first retaining notches formed in said respective leading edges and a corresponding plurality of second retaining notches formed in said respective trailing edges to accommodate a plurality of fiber optic cables; and a tensioning assembly contacting the fiber optic cables each at a point between said first and second radius guides providing tension to the fiber optic cables, said tensioning assembly including a plurality of leaf springs which are each biasable against respective fiber optic cables.

6. A slack managing system according to claim 5, further comprising at least one foot on a bottom surface of said first radius guide attachable to the circuit board.

7. A slack managing system according to claim 5, wherein a radius of said central curved portion is approximately a minimum bend radius of the fiber optic cable being supported.

8. A slack managing system according to claim 5, further comprising retaining cross arms respectively formed over said retaining notches, wherein when a cable is a shorter cable, the cable contacts respective undersides of said retaining cross arms, and when a cable is a longer cable, the cable contacts respective lower edges of said retaining notches.

9. A slack managing system according to claim 5, further comprising elevating clips to elevate the cable above the circuit board in front of said leading edge of said first radius guide.

10. A slack managing system according to claim 5, said tensioning assembly being attachable to one of said radius guides.

11. A slack managing system according to claim 5, said tensioning assembly being attachable to the circuit board above one of said radius guides.

12. A slack managing system according to claim 5, wherein said first radius guide is disposed on the circuit board so that said leading edge is disposed closer to a front side of the circuit board and said trailing edge is disposed closer to the rear side of the circuit board.

13. A slack managing system according to claim 5, wherein said radius guide is adapted to accommodate multi-fiber ribbon cable.

* * * * *